United States Patent
Bond et al.

(10) Patent No.: US 10,230,706 B2
(45) Date of Patent: Mar. 12, 2019

(54) USING PERSONAL RF SIGNATURE FOR ENHANCED AUTHENTICATION METRIC

(71) Applicant: LENOVO Enterprise Solutions (Singapore) PTE. LTD., New Tech Park (SG)

(72) Inventors: David E. Bond, Raleigh, NC (US); Joel D. Diaz, Cary, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 79 days.

(21) Appl. No.: 14/925,841

(22) Filed: Oct. 28, 2015

(65) Prior Publication Data
US 2017/0126648 A1  May 4, 2017

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 9/54 | (2006.01) |
| G07C 9/00 | (2006.01) |
| G06F 21/31 | (2013.01) |
| H04W 12/08 | (2009.01) |
| H04W 4/80 | (2018.01) |
| G06F 21/34 | (2013.01) |

(52) U.S. Cl.
CPC .............. *H04L 63/08* (2013.01); *G06F 9/542* (2013.01); *G06F 21/31* (2013.01); *G06F 21/34* (2013.01); *G07C 9/00031* (2013.01); *G07C 9/00103* (2013.01); *H04L 63/0492* (2013.01); *H04L 63/10* (2013.01); *H04L 63/102* (2013.01); *H04W 4/80* (2018.02); *H04W 12/08* (2013.01); *G07C 9/00571* (2013.01)

(58) Field of Classification Search
None
See application file for complete search history.

(56) References Cited

U.S. PATENT DOCUMENTS

| | | | | |
|---|---|---|---|---|
| 8,943,187 | B1 * | 1/2015 | Saylor | H04L 67/306 709/223 |
| 9,009,790 | B2 * | 4/2015 | Wuthnow | G06F 21/6245 713/168 |
| 9,509,676 | B1 * | 11/2016 | Johnson | H04L 63/08 |
| 2006/0256959 | A1 * | 11/2006 | Hymes | H04M 1/26 379/433.04 |

(Continued)

OTHER PUBLICATIONS

Wikipedia, "Device fingerprint", https://en.wikipedia.org/wiki/Device_fingerprint, last visited Sep. 29, 2015.

(Continued)

*Primary Examiner* — Kambiz Zand
*Assistant Examiner* — Arezoo Sherkat
(74) *Attorney, Agent, or Firm* — Kunzler, PC (57) ABSTRACT

A method for verifying identity includes associating with a person, one or more ID signals emitted by a personal device. The method includes detecting one or more ID signals, and confirming identity of the person in response to verifying identity of the person based upon identifying credentials from the person and verifying that one or more of the detected ID signals are associated with the person.

15 Claims, 7 Drawing Sheets

(56) References Cited

U.S. PATENT DOCUMENTS

| | | | | |
|---|---|---|---|---|
| 2008/0024272 | A1* | 1/2008 | Fiske | E05B 47/0002 340/5.83 |
| 2009/0044012 | A1* | 2/2009 | Bishop | G06Q 20/20 713/168 |
| 2010/0274859 | A1* | 10/2010 | Bucuk | H04L 63/08 709/206 |
| 2012/0154117 | A1* | 6/2012 | Nice | G06F 21/32 340/5.82 |
| 2012/0161927 | A1* | 6/2012 | Pierfelice | H04L 63/10 340/5.83 |
| 2012/0255875 | A1* | 10/2012 | Vicente | A61B 5/002 205/782 |
| 2014/0026204 | A1* | 1/2014 | Buntinx | H04L 63/062 726/9 |
| 2014/0188738 | A1* | 7/2014 | Huxham | H04L 63/10 705/73 |
| 2014/0282929 | A1* | 9/2014 | Tse | H04L 63/08 726/5 |
| 2014/0333414 | A1* | 11/2014 | Kursun | G06K 9/00926 340/5.82 |
| 2014/0337930 | A1* | 11/2014 | Hoyos | H04L 63/10 726/4 |
| 2015/0003320 | A1* | 1/2015 | Anderson | H04W 12/06 370/328 |
| 2015/0310444 | A1* | 10/2015 | Chen | G06Q 20/4016 705/44 |
| 2015/0382195 | A1* | 12/2015 | Grim | H04L 63/08 726/4 |
| 2016/0142443 | A1* | 5/2016 | Ting | H04L 63/20 726/1 |
| 2016/0205083 | A1* | 7/2016 | Kusens | H04L 63/08 726/4 |
| 2016/0212129 | A1* | 7/2016 | Johnston | G06F 21/73 |
| 2016/0241531 | A1* | 8/2016 | Loughlin-McHugh | H04L 63/102 |
| 2016/0261425 | A1* | 9/2016 | Horton | G05B 15/02 |
| 2016/0294973 | A1* | 10/2016 | Bakshi | H04L 67/306 |
| 2016/0301674 | A1* | 10/2016 | Uetabira | H04W 4/028 |
| 2016/0308859 | A1* | 10/2016 | Barry | H04L 63/10 |

OTHER PUBLICATIONS

Secure Key, "Groundbreaking SecureKey Multi-Factor Authentication Service Simplifies Mobile App Security", http://securekey.com/press-releases/groundbreaking-securekey-multi-factor-authentication-service-simplifies-mobile-app-security/ , Toronto, Canada, Sep. 25, 2013.

Information Security Stack Exchange, "How does Google detect new devices for two factor authentication" http://security.stackexchange.com/questions/37123/how-does-google-detect-new-devices-for-two-factor-authentication, last visited on Sep. 29, 2015.

Joy Mali, "Can Your Smartphone Help You Prevent Identity Fraud?", http://www.lifehack.org/articles/technology/can-your-smartphone-help-you-prevent-identity-fraud.htmll. Last visited Sep. 29, 2015.

* cited by examiner

USING PERSONAL RF SIGNATURE FOR ENHANCED AUTHENTICATION METRIC

FIELD

The subject matter disclosed herein relates to verifying identity and more particularly relates to verifying identity using identifying credentials plus identification signals.

BACKGROUND

Often credit cards and other identifying credentials are lost or stolen and a person other than the person owning the identifying credentials attempts to use a lost or stolen credit card, identification ("ID") badge, key, etc. to illegally complete a financial transaction, to gain unauthorized entry, etc. While advances in identifying credentials have improved, they are still vulnerable to use by unauthorized parties.

BRIEF SUMMARY

A method for verifying identity is disclosed. An apparatus and system also perform the functions of the method. The method includes associating with a person, one or more ID signals emitted by a personal device, detecting one or more ID signals, and confirming identity of the person in response to verifying identity of the person based upon identifying credentials from the person and verifying that one or more of the detected ID signals are associated with the person.

In one embodiment, the method includes generating and sending an alert in response to one or more of the detected ID signals not matching the ID signals associated with the person. In various embodiments, the method includes, in response to receiving the alert, denying entry of the person when the identifying credentials include a request for entry, declining a financial transaction when the identifying credentials include a request to approve a financial transaction, and/or maintaining a lock in a locked state when the identifying credentials include a request to open the lock. In another embodiment, generating the alert in response to one or more of the detected ID signals not matching the ID signals associated with the person also includes generating the alert in response to one or more of the detected ID signals being associated with a different person, and/or determining if a percentage of the detected ID signals matching ID signals associated with the person is above a match threshold.

In one embodiment, an ID signal of the one or more ID signals includes a wireless transmission with a unique identifier that differs from other identifiers transmitted wirelessly. In one embodiment the ID signal includes a radio frequency identification ("RFID") signal, an identification signal transmitted using a near field communication protocol, an identification signal transmitted using a short distance data exchange protocol, and/or an identifier transmitted over a Wi-Fi network. In some embodiments, the one or more ID signals are transmitted from an ID transmitter in a vehicle of the person, an ID transmitter in a key fob of the person, an ID transmitter in an electronic device attached to the person, an ID transmitter in an access card, an ID transmitter in a portable electronic device, an ID transmitter in a portable communication device of the person, an ID transmitter in a credit card, an ID transmitter in a debit card, and/or an ID transmitter in a card issued by a vendor.

In another embodiment, associating one or more ID signals with a person includes storing the one or more ID signals in a database entry along with identifying credentials of the person. In another embodiment, associating one or more ID signals with a person includes an action by the person to register the ID signals. In another embodiment, associating one or more ID signals with a person includes an action by a party without an action by the person.

In one embodiment, associating one or more ID signals with a person includes detecting one or more ID signals, determining that the one or more detected ID signals are not currently associated with the person, and associating the one or more detected ID signals with the person. In another embodiment, the identifying credentials of the person includes an ID signal in addition to the one or more detected ID signals with the person, a wireless request, a keypad entry, a retina scan, a scan from a fingerprint reader, a scan from a magnetic stripe reader, a body scan of the person, an image of the person, and/or insertion of a key in a lock.

An apparatus for verifying identity includes an association module that associates, with a person one or more ID signals by a personal device, an ID detection module that detects one or more ID signals, and a confirmation module that confirms identify of the person in response to verifying identity of the person based upon identifying credentials from the person and the ID detection module verifying that one or more of the detected ID signals are associated with the person.

In one embodiment, the apparatus includes an alert module that generates and sends an alert in response to one or more of the detected ID signals not matching the ID signals associated with the person. In other embodiments, the apparatus includes a denial module that, in response to receiving the alert, denies entry of the person when the identifying credentials of the person include a request for entry, declines a financial transaction when the identifying credentials of the person include a request to approve a financial transaction, and/or maintains a lock in a locked state when the identifying credentials of the person include a request to open the lock. In another embodiment, generating the alert in response to one or more of the detected ID signals not matching the ID signals associated with the person includes generating the alert in response to one or more of the detected ID signals being associated with a different person, and/or a match threshold module determining if a percentage of the detected ID signals matching ID signals associated with the person is above a match threshold.

In one embodiment, the association module associating one or more ID signals with a person includes the ID detection module detecting one or more ID signals by a personal device and determining that the one or more detected ID signals are not currently associated with the person, and/or the association module associating the one or more detected ID signals with the person.

In another embodiment, the confirmation module confirms identify by verifying identity of the person based upon identifying credentials includes verifying that an ID signal in addition to the one or more detected ID signals is associated with the person, processing a wireless request and verifying that an identification signal in the wireless request corresponds to the person, verifying that a keypad entry matches a stored code, verifying that a retina scan matches a retina scan of the person, verifying that a scan from a fingerprint reader matches a fingerprint of the person, verifying that a scan from a magnetic stripe reader is valid, verifying that a body scan of the person includes elements that match identifying characteristics of the person, verifying that an image of the person matches a stored image of the person, and/or allowing tumblers in a lock to unlock a lock in response to insertion of a key in a lock and turning the key in the lock;

A system for verifying identity includes one or more signal sensors, an ID receiver, an association module that associates, with a person one or more ID signals by a personal device, an ID detection module that detects, using the one or more signal sensors, one or more ID signals, and a confirmation module that confirms identify of the person in response to verifying identity of the person based upon identifying credentials from the person via the ID receiver and verifying that one or more of the detected ID signals are associated with the person. The system includes an alert module that generates and sends an alert in response to one or more of the detected ID signals not matching the ID signals associated with the person.

In one embodiment, the system includes a hardware processor, one or more computer readable storage media in communication with the hardware processor, where said modules are stored on the one or more computer readable storage media and execute on the hardware processor, and a database comprising identification information for each person and ID signals associated with each person.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in executable code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, in the form of executable code, the software portions are stored on one or more computer readable storage devices.

Any combination of one or more computer readable medium may be utilized. The computer readable medium may be a computer readable storage medium. The computer readable storage medium may be a storage device storing the executable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Executable code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by executable code. The executable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The executable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The executable code may also be loaded onto a computer, other programmable data processing apparatus, or other devices to cause a series of operational steps to be performed on the computer, other programmable apparatus or other devices to produce a computer implemented process such that the executable code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of executable code, which comprises one or more executable instructions of the executable code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and executable code.

The description of elements in each figure may refer to elements of proceeding figures. Like numbers refer to like elements in all figures, including alternate embodiments of like elements.

Figure 1:
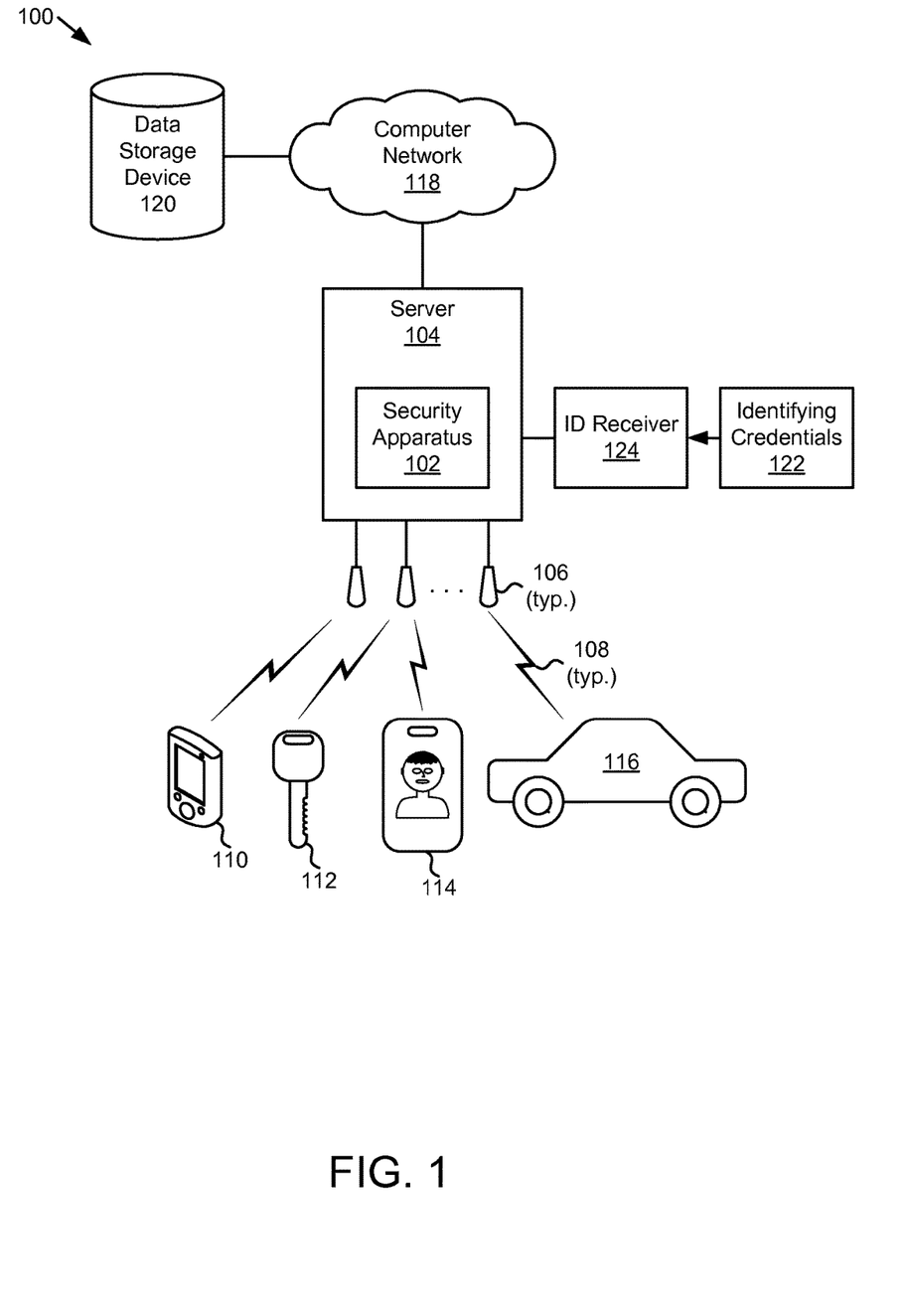
FIG. 1 is a schematic block diagram illustrating one embodiment of a system for verifying identity.

FIG. 1 is a schematic block diagram illustrating one embodiment of a system 100 for verifying identity. The system 100 includes, in one embodiment, a security apparatus 102 that may be embodied in a server 104, one or more signal sensors 106, one or more identification ("ID") signals 108, from devices such as a mobile communication device 110, a key fob 112, an ID badge 114 or similar card-type device 114, a vehicle 116, and the like, a computer network 118 and a data storage device 120, identifying credentials 122, and an ID receiver 124, which are described below.

The security apparatus 102, in general, confirms identity of a person by verifying identity of the person based on identifying credentials 122 from the person and verifying that one or more detected ID signals 108 are associated with the person. The security apparatus 102 is explained in more detail with regard to the apparatuses 200, 300 of FIGS. 2 and 3. In one embodiment, the security apparatus 102 is embodied by a server 104 as depicted in FIG. 1 or another computing device, such as a desktop computer, a laptop computer, a tablet, a specialized security device, and the like. In another embodiment, the security apparatus 102 is embodied in more than one device. One of skill in the art will recognize other ways to implement the security apparatus 102.

The system 100 includes one or more signal sensors 106 that detect ID signals 108 and transmit the detected ID signals 108 to the security apparatus 102. In one embodiment the ID signals 108 are wireless signals transmitted wirelessly from a device of the person to the signal sensors 106 with a wireless connection. For example, an ID signal 108 may be a radio frequency identification ("RFID") signal from an RFID transmitter in a device of the person. In another embodiment, an ID signal 108 may be transmitted using a wireless protocol, such as a near field communication ("NFC") protocol an ant plus ("ANT+®") protocol, a WiFi protocol, and the like. As depicted, in one embodiment, the signal sensors 106 are connected to the server 104 and/or security apparatus 102.

In other embodiments, the signal sensors 106 may connect over a computer network 118 to the security apparatus 102 or the security apparatus 102 may be a distributed system with modules spread out over various devices in a building, a facility, in a complex or spread out over remote locations. The various modules in a distributed security apparatus 102 may communicate over the computer network 118.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM")®, the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA")®. Alternatively, the wireless connection may be a cellular telephone network communication. All standards and/or connection types include the latest version and revision of the standard and/or connection type as of the filing date of this application.

An RFID transmitter may be used to transmit the ID signal 108 because an RFID transmitter responds to a signal, such as from a signal sensor 106, and then transmits an ID signal 108. The signal sensor 106 may include a capability to send out a request to transmit an ID signal 108 to devices on or near the person. A signal sensor 106 may also work in conjunction with the security apparatus 102 to communicate wirelessly with one or more ID signal transmitters in devices (e.g. 110, 112, 114, 116) of the person. One of skill in the art will recognize other forms of a signal sensor 106.

The ID signal 108, in one embodiment, is a signal that is unique. For example, the ID signal 108 may be one of a kind and differs from all other ID signals. An ID signal 108 may be unique to the personal device transmitting the ID signal 108. In another embodiment, the ID signal 108 is at least locally unique and differs from other ID signals transmitted locally in the facility or in the city or in the state or in the country where the security apparatus 102 is deployed. For example, the ID signal 108 may be unique enough to be distinguished from ID signals that may be encountered by the signal sensors 106 connected to the security apparatus 102. In another embodiment, the ID signals 108 are unique to the person and may be identical or substantially identical to other ID signals associated with the person.

An ID signal 108 is transmitted from an ID transmitter in a device of the person. As used herein, an ID transmitter is a device capable of transmitting an ID signal 108 and may also transmit other data and may be used for other wireless communications. An ID transmitter is not limited to merely transmitting an ID signal 108. In certain embodiments, an ID transmitter transmits the ID signal 108 in response to a request to transmit the ID signal 108. For example, an ID signal 108 may be transmitted from a mobile communication device 110, such as a smartphone, a cellular phone, a portable music player, a device worn on a body part, such as a watch with communication abilities, a fitness monitor, or other device capable of sending an ID signal 108. In one embodiment, the mobile communication device 110 is a smartphone that transmits an ID signal 108 using a WiFi transmitter, a cellular transmitter, an NFC transmitter, an ANT+ signal, a Bluetooth transmitter, and the like.

Typically a smartphone includes wireless communication capabilities and can send an ID signal 108 that identifies the smartphone to a cellular carrier, to an NFC receiver, a Bluetooth receiver, etc. Other mobile communication devices 110 may be compatible with an ANT+ or similar protocol that enables communication with a nearby device. For example, a heart rate monitor may use an ANT+ protocol to communicate with another device, such as a smartphone, a wrist-mounted receiver, a bicycle computer, etc., and may transmit an ID signal 108 to pair with the other device.

In another embodiment, the ID signal 108 may be transmitted from a key or key fob. For example, modern vehicle keys often include an RFID transmitter that transmits an ID signal 108 during the ignition process. In another embodiment, a key fob, such as a key fob used to unlock a vehicle, start a vehicle or otherwise perform some function associated with the vehicle via wireless signal, may transmit an ID signal 108. A signal sensor 106 may detect an ID signal 108 transmitted from a key fob.

In another embodiment, the ID signal 108 may be transmitted from an ID badge 114 or similar card-type device 114. For example, many ID badges and access cards in the form of a card-type device 114, such as those used to unlock a door to a facility, a card used to open a vehicle gate, and the like include a wireless transmitter that transmits an ID signal 108. For example, an ID badge 114 or card-type device 114 may include an RFID transmitter that transmits an ID signal 108 when placed in proximity to an RFID reader. A signal sensor 106 may be configured, for example, with a higher power transmitter than a typical RFID receiver to transmit a signal capable of triggering the RFID transmitter in the ID badge 114 or card-type device 114 over a distance longer than a typical ID badge 114 reader or card-type device 114 reader. In other embodiments, a signal sensor 106 may be located strategically to trigger sending of the ID signal 108.

In another embodiment, an ID signal 108 may be transmitted from a vehicle 116 of the person. For example, if a person is attempting a transaction at a bank, a credit union, or the like, the person may be driving a vehicle 116 to an automated teller machine ("ATM") where signal sensors 106 are positioned in proximity to the vehicle 116 of the person. Modern vehicles 116 often include wireless devices capable of transmitting an ID signal 108. For example, many vehicles 116 are equipped with wheels that include a tirepressure monitoring system ("TPMS") where each TPMS device in a wheel includes an RFID transmitter that sends and ID signal 108 that may be paired with controls in the vehicle 116.

Other vehicles 116 include Bluetooth capabilities for connection of a music player, smartphone for hands-free operation, and the like. One or more of the devices in a vehicle 116 may transmit an ID signal 108 that may be detected by a signal sensor 106 in proximity to the vehicle. While the vehicle 116 may be an automobile, a sport-utility vehicle, a truck, etc. other vehicles, such as a motorized wheelchair, a scooter, a bicycle, etc. may also include a wireless transmitter capable of transmitting an ID signal 108.

While several devices are depicted in FIG. 1, the embodiments of the invention described herein contemplate other devices that include a wireless communication capability, such as laptops, tablets, wristwatches, pacemakers, an ID chip in a dog, and any other device in a person, on a person or controlled or possessed by the person while the person is attempting to establish identity. One of skill in the art will recognize other devices capable of transmitting an ID signal 108.

In one embodiment, the security apparatus 102 and/or server 104 is in communication with a data storage device 120 that includes a database with one or more ID signals 108 associated with a person. In one embodiment, the data storage device 120 is connected via a computer network 118, such as a local area network ("LAN"), a wireless connection, an Internet connection, and the like. The computer network 118 may include one or more switches, routers, data cables, transmitters, and the like normally associated with a computer network 118. In one embodiment, the computer network 118 includes multiple networks functioning to transmit data from the data storage device 120 to the security apparatus 102 and/or server 104.

In one embodiment, the data storage device 120 is internal to the server 104 or other computing device that includes the security apparatus 102. In another embodiment, the data storage device 120 is located externally to the server 104, laptop, etc. that includes the security apparatus 102. For example, the data storage device 120 may include one or more computer readable storage media in a network, such as a storage area network, in an array, etc. One of skill in the art will recognize other forms of a data storage device 120 with a database of people associated with ID signals 108 and in communication with the security apparatus 102.

In one embodiment, the system 100 receives one or more identifying credentials 122 of a person through an ID receiver 124. The identifying credentials 122 are described below with respect to the apparatus 200 of FIG. 2. Typically the identifying credentials 122 are presented by the person to an ID receiver 124 when a person is attempting to establish identity for a financial transaction, to gain access, to open a lock, or other activity where verifying identity of the person is useful. The ID receiver 124, in various embodiments, may include a terminal, a keypad, a scanner, a card reader, or other device used to receive identifying credentials 122. For example, a person may present identifying credentials 122 in the form of a credit card and the ID receiver 124 may include a credit card reader. In another example, the person may present identifying credentials 122 in the form of an ID badge with an RFID chip and the ID receiver 124 may include an RFID reader at security checkpoint. The one or more signal sensors 106 are typically present at the location of the ID receiver 124 or in a location where the person passes on the way to the ID receiver 124.

Figure 2:
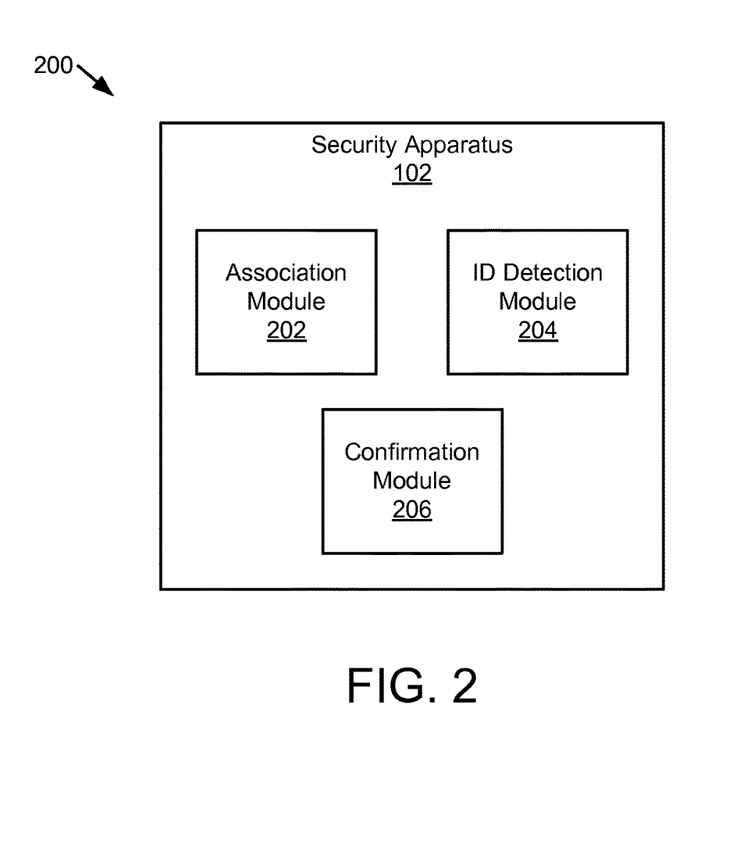
FIG. 2 is a schematic block diagram illustrating one embodiment of an apparatus for verifying identity.

FIG. 2 is a schematic block diagram illustrating one embodiment of an apparatus 200 for verifying identity. The apparatus 200 includes one embodiment of the security apparatus 102 with an association module 202, an ID detection module 204 and a confirmation module 206, which are described below.

The apparatus 200, in one embodiment, includes an association module 202 that that associates, with a person one or more ID signals 108 emitted by a personal device. The personal device, in various embodiments, may include devices such as a mobile communication device 110, a key fob 112, an ID badge 114 or similar card-type device 114, a vehicle 116, as depicted in FIG. 1, but may also include a tablet computer, a laptop computer, a portable electronic device, a credit card, a debit card, a loyalty card, a pacemaker, ID chip in a pet, or any other device capable of transmitting an ID signal.

In one embodiment, the association module 202 associates one or more ID signals 108 with the person by associating the ID signals 108 with a name of the person. Other embodiments include associating other identifying credentials 122 with the person, such as an address, phone number, email address, social security number, a password, a personal identification number ("PIN"), a membership number of a vendor, an account number, an age, height, hair color, etc. of the person, or other information useful to identify the person. In one embodiment, identifying credentials 122 of the person listed above may be a portion of identifying credentials 122 used to gain access, complete a financial transaction, open a lock, verify identity or other activity associated with identifying credentials 122.

In addition to the identifying credentials 122 and other personal information, the association module 202 associates one or more ID signals 108 with the person. In one embodiment, the association module 202 associates the ID signals 108 by an action by the person to register the ID signals 108. For example, the person may take steps to register ID signals 108 with the security apparatus 102 or with another service that compiles associations of ID signals 108 with people. For instance, an organization not associated with users of the security apparatus 102 may compile personal information of people and associate each person with one or more ID signals 108. Hereinafter, the association module 202 associating one or more ID signals 108 with a person may include accessing a database that includes associations between people and ID signals 108 that have been previously associated.

In another embodiment, the association module 202 associates a person with one or more ID signals 108 by creating an entry in a log, a database, a file or other data structure that links the person with one or more ID signals 108 for future use. The person may, for example, present identifying credentials 122 personally or electronically in a situation where identity may be confirmed using the identifying credentials 122 and then the person may then present various personal devices for scanning by signal sensors 106 to detect ID signals 108 from the personal devices. In another embodiment, the person may present the ID signals 108 in another form, such as an ID number transmitted in an ID signal 108. In one embodiment, numerous people may register various ID signals 108 transmitted from personal devices and the association module 202 builds a database of associations between ID signals 108 and identifying credentials 122 of people.

In one embodiment, the apparatus 200 includes an ID detection module 204 that detects one or more ID signals 108. For example, the ID detection module 204 may receive one or more ID signals 108 from the one or more signal sensors 106. In one embodiment, the ID detection module 204 detects ID signals that are different from identifying credentials 122 received by the ID receiver 124. In another embodiment, the identifying credentials 122 may be the same type or of a similar type as the one or more ID signals 108 detected by the ID detection module 202, but the one or more ID signals 108 are in addition to the identifying credentials 122 received by the ID receiver 124.

In one embodiment, the ID detection module 204 initiates detection of the one or more ID signals 108. For example, the ID detection module 204 may initiate detection in response to a person presenting identifying credentials 122. In another embodiment, the detection module 204 initiates detection in response to the person and/or personal devices of the person being within the vicinity of the signal sensors 106. For example, the signal sensors 106 or other sensors may detect the person or personal devices of the person and the ID detection module 204 may detect one or more ID signals 108. In one example, the security apparatus 102 includes selected signal sensors 106 dedicated to detecting ID signals 108 for associating the ID signals 108 with the person. For instance, a bank, a security center, etc. may have a location where a person presents identifying credentials 122 and has personal devices scanned for ID signals 108 for the association module 202 to associate the ID signals 108 with the person.

In another embodiment, the ID detection module 204 and/or signal sensors 106 transmit a signal that initiates transmitting the one or more ID signals 108. For example, where an ID signal 108 is an RFID signal, the detection module 206 and/or signal sensors 106 may transmit a signal that triggers a personal device to transmit an RFID signal. The signal sensors 106 may transmit a signal appropriate for a distance from the signal sensor 106 to the personal device. For example, where the personal device is typically read at a short distance, the signal sensors 106 may be positioned further away than a typical reader for the personal device and the ID detection module 204 and/or signal sensors 106 may transmit a signal stronger than transmitted by a typical reader.

In one embodiment, the ID detection module 204 detects the one or more ID signals 108 by detecting a code within the ID signal 108 108, such as a sequence of numbers and/or letters that are in a form matching a format of the ID signals 108 associated with a person. For example, the personal device may transmit an ID signal 108 digitally and the ID detection module 204 may decode the ID signal 108. In other embodiments, the ID detection module 204 communicates with the personal device to establish a communication channel for transmitting an ID signal 108 and may use one or more wireless protocols.

In another embodiment, the one or more signal sensors 106 are capable of receiving ID signals 108 of various types and protocols. For example, a signal sensor 106 may be capable of receiving ID signals 108 of various types. In another example, the ID detection module 204 is connected to multiple signal sensors 106 where each signal sensor 106 is capable of detecting an ID signal 108 of one type.

In one embodiment, the association module 202 associates one or more ID signals 108 with a person by an action by a party without an action by the person. For example, the person may present identifying credentials 122 for a transaction, to gain entry, etc. and the ID detection module 204 may detect one or more ID signals 108 that are not associated with the person. The association module 202 may then associate the detected ID signals 108 with the person. For example, when the security apparatus 102 is first deployed, a database with ID signals 108 associated with a person may not exist and the ID detection module 204 and the association module 202 may work together to build a database of people and associated ID signals 108 without each person being specifically aware of the actions of the association module 202 and the ID detection module 204.

In one embodiment, the ID detection module 204 and the association module 202 detect and associate ID signals 108 in response to an event that has a higher level of verification of identity of the person, such as verifying identity using identifying credentials 122 of the person along with additional verification steps, such as interaction with a party that can compare a photo of the persons to the person, asking additional security questions, and the like. Detection of ID signals 108 may be with or without knowledge of the person during the higher verification process. In another embodiment, the ID detection module 204 and the association module 202 detect and associate ID signals 108 in response to a typical verification process during an initial database construction period and then use the database later for increased security for verifying identification.

In one embodiment, the apparatus 200 includes a confirmation module 206 that confirms identify of the person in response to verifying identity of the person based upon identifying credentials 122 from the person and verifying that one or more of the detected ID signals 108 are associated with the person. Using a dual verification process increases security and helps to avoid situations of a person using a stolen card or other identifying credentials 122. Typically, as is the case in the current practice, where verification is not confirmed using identifying credentials 122 alone, identity is not confirmed and the person seeking verification of identity is rejected for entry, a lock is not opened, a financial transaction is denied, etc. Where the confirmation module 206 confirms identity of the person based on identifying credentials 122 presented by the person, the confirmation module 206 takes the additional steps of determining id the ID signals 108 detected by the ID detection module 204 match ID signals 108 associated with the person, and if this second verification is confirmed using the ID signals 108, the confirmation module 206 confirms identity of the person.

Figure 3:
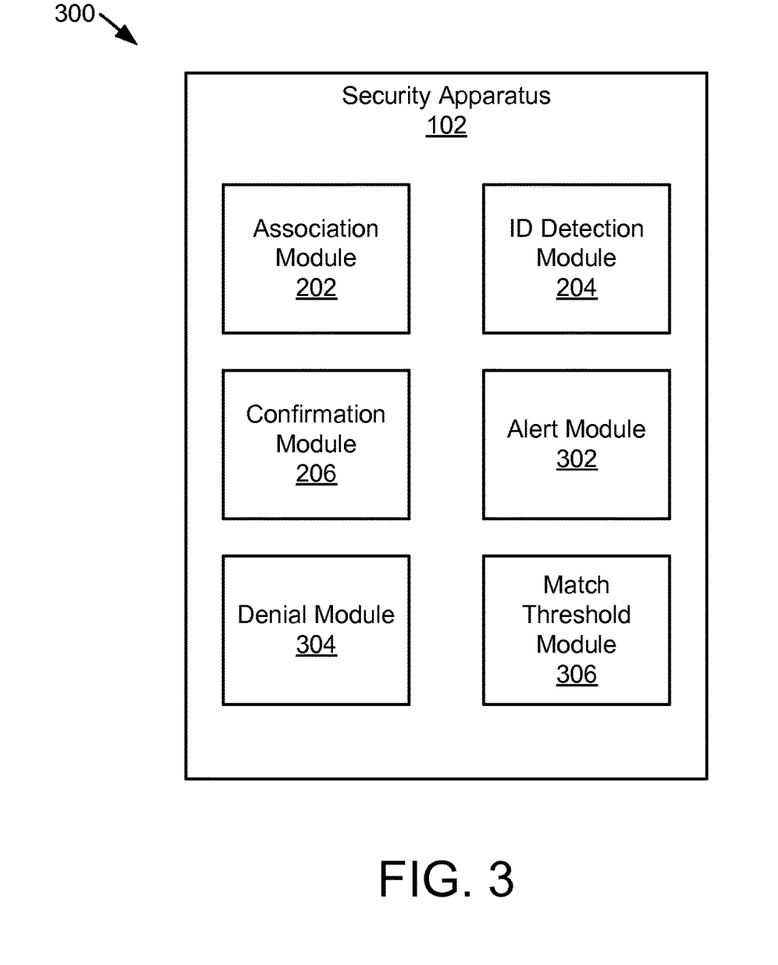
FIG. 3 is a schematic block diagram illustrating one embodiment of another apparatus for verifying identity.

FIG. 3 is a schematic block diagram illustrating one embodiment of another apparatus 300 for verifying identity. The apparatus 300 includes another embodiment of the security apparatus 102 with an association module 202, an ID detection module 204 and a confirmation module 206, which are substantially similar to those described above in relation to the apparatus 200 of FIG. 2. In various embodiments, the apparatus 300 may also include an alert module 302, a denial module 304 and a match threshold module 306, which are described below.

In one embodiment, the apparatus 300 includes an alert module 302 that that generates and sends an alert in response to one or more of the detected ID signals 108 not matching the ID signals 108 associated with the person. For example, the alert module 302 may generate and send an alert if one of one or more ID signals 108 detected by the ID detection module 204 does not match ID signals 108 associated with the person that presented identifying credentials 122. Various combinations and conditions may also be placed on matching detected ID signals 108 with ID signals 108 associated with the person and some are described below. The alert module 302 may also generate and send an alert in response to the presented identifying credentials 122 not being valid, not matching the person, etc.

In one embodiment, the alert module 302 generates an alert in response to one or more of the detected ID signals 108 being associated with a different person. For example, detecting an ID signal 108 associated with another person may indicate that the person presenting the identifying credentials 122 has stolen the identifying credentials 122 or is improperly using the identifying credentials 122. In another example, detecting an ID signal 108 associated with another person may indicate that the person presenting the identifying credentials 122 has a personal device of another person, which may reduce a trust factor and may indicate further verification steps may be necessary to restore trust in the personal presenting the identifying credentials 122. For instance, further steps may be taken to ensure that the person presenting the identifying credentials 122 has a legitimate reason to possess the personal device emitting the ID signal 108 not associated with the person, such as the personal device is borrowed from a family member or was recently purchased by the person. In another embodiment, the ID detection module 204 detecting an ID signal 108 associated with another person my merely trigger additional verification steps.

In another embodiment, the apparatus 300 includes a denial module 304 that, in response to receiving the alert, denies entry of the person when the identifying credentials 122 of the person include a request for entry. In another embodiment, the denial module 304, in response to receiving the alert, declines a financial transaction when the identifying credentials 122 of the person include a request to approve a financial transaction. In another embodiment, the denial module 304, in response to receiving the alert, maintains a lock in a locked state when the identifying credentials 122 of the person include a request to open the lock. In other embodiments, the denial module 304, in response to receiving the alert, denies some other access or request.

In one embodiment, the apparatus 300 includes a match threshold module 306 and the alert module 302 generating the alert includes the match threshold module 306 determining if a percentage of the detected ID signals 108 matching ID signals 108 associated with the person is above a match threshold. For example, if the ID detection module 204 detects four ID signals 108, the match threshold may be set at 75% and the match threshold module 306 may decline verification if two of the four detected ID signals 108 do not match ID signals 108 associated with the person and may confirm verification of the identity of the person where three of the four or four of the four detected ID signals 108 match the ID signals 108 associated with the person. Where the match threshold module 306 declines verification, the alert module 302 may then generate and send an alert and the denial module 304 may act to deny entrance, decline a transaction, etc.

In one embodiment, the match threshold module 306 uses multiple match thresholds, depending on how many ID signals 108 are detected by the ID detection module 204. For example, as the number of detected ID signals 108 increases, the match thresholds may decrease assuming that there is a higher likelihood of a non-match as the number of personal devices that transmit an ID signal 108 increases. One of skill in the art will recognize other criteria and match thresholds to confirm verification of identity based on detected ID signals 108.

Figure 4:
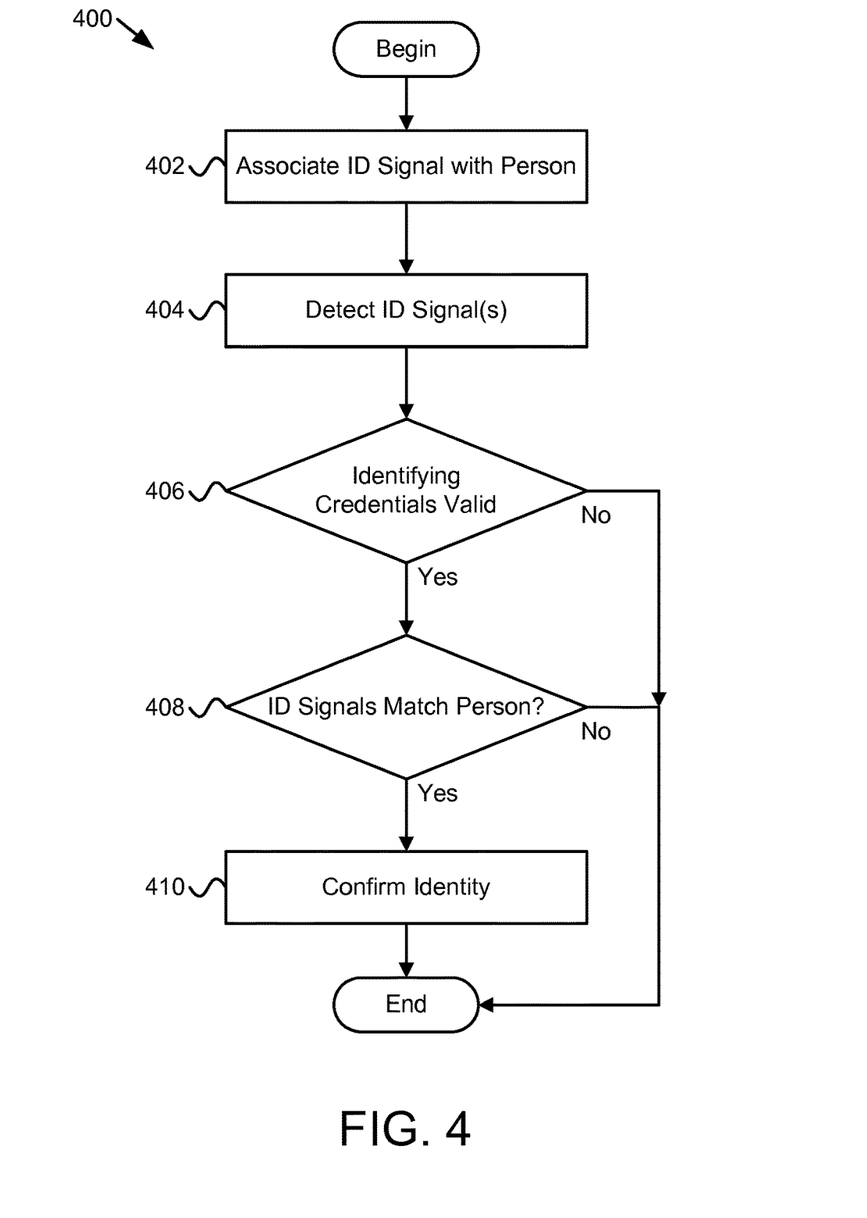
FIG. 4 is a schematic flow chart diagram illustrating one embodiment of a method for verifying identity.

FIG. 4 is a schematic flow chart diagram illustrating one embodiment of a method 400 for verifying identity. The method 400 begins and associates 402 with a person, one or more ID signals 108 emitted by a personal device. The personal device may be a mobile communication device 110, a key fob 112, an ID badge 114 or similar card-type device 114, a vehicle 116, and the like. The ID signals 208 are unique and may be expressed in a form that may be stored in a database. In one embodiment, the association module 202 associates 402 the ID signals 108 with the person.

The method 400 detects 404 one or more ID signals 108. In one embodiment, the ID detection module 204 detects 404 the ID signals 108 and may use one or more signal sensors 106 for the detection. The method 400 determines 406 if identifying credentials 122 presented by the person are valid or are associated with the person. If the method 400 determines 406 that the identifying credentials 122 are not valid, the method 400 ends. If the method 400 determines 406 that the identifying credentials 122 are valid, the method 400 determines 408 if one or more of the detected ID signals 108 match ID signals 108 associated with the person.

If the method 400 determines 408 that one or more of the detected ID signals 108 do not match ID signals 108 associated with the person, the method 400 ends. If the method 400 determines 408 that one or more of the detected ID signals 108 match ID signals 108 associated with the person, the method 400 confirms 410 the identity of the person, and the method 400 ends. In one embodiment, the confirmation module 206 determines 406 if the identifying credentials 122 are valid and determines 408 that the ID signals 108 match the ID signals 108 associated with the person and confirms 410 identity of the person.

Figure 5:
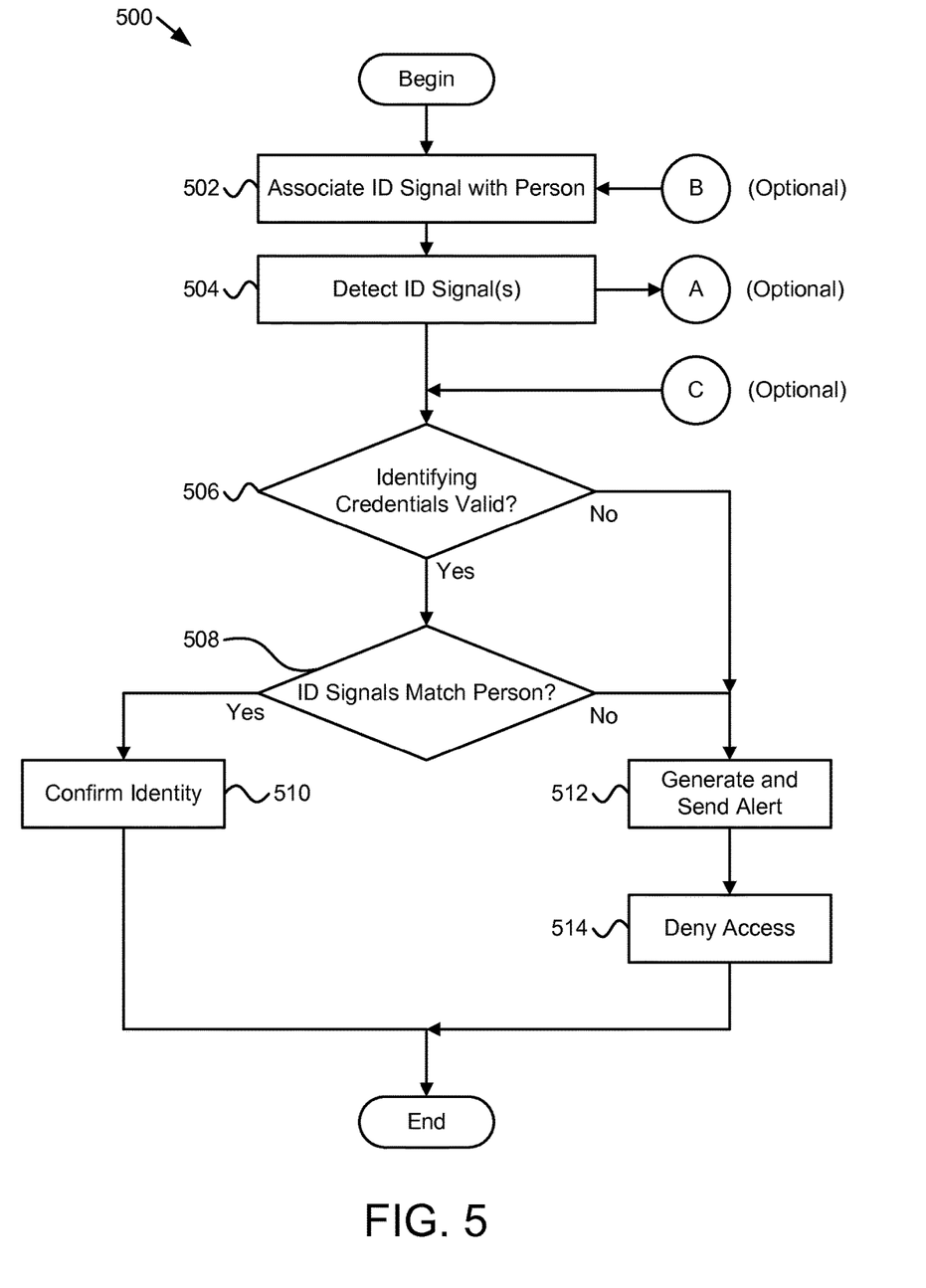
FIG. 5 is a schematic flow chart diagram illustrating another embodiment of a method for verifying identity.

FIG. 5 is a schematic flow chart diagram illustrating another embodiment of a method 500 for verifying identity. The method 500 begins and associates 502 with a person, one or more ID signals 108 emitted by a personal device. The association module 202 may associate 502 the ID signals 108 with the person. The method 500 detects 504 one or more ID signals 108. The ID detection module 204 may detect 504 the ID signals 108 and may use one or more signal sensors 106 for the detection. The method 500 determines 506 if identifying credentials 122 presented by the person are valid or are associated with the person. If the method 500 determines 506 that the identifying credentials 122 are valid, the method 500 determines 508 if one or more of the detected ID signals 108 match ID signals 108 associated with the person.

If the method 500 determines 508 that one or more of the detected ID signals 108 match ID signals 108 associated with the person, the method 500 confirms 510 the identity of the person, and the method 500 ends. If the method 500 determines 506 that the identifying credentials 122 are not valid or determines 508 that one or more of the detected ID signals 108 do not match ID signals 108 associated with the person, the method 500 generates 512 and sends 512 an alert. In one embodiment, the confirmation module 206 determines 506 if the identifying credentials 122 are valid and determines 508 that the ID signals 108 match the ID signals 108 associated with the person and confirms 610 identity of the person. In another embodiment, the alert module 302 generates and sends an alert.

In one embodiment, the method 500 denies 514 the person access to the transaction, location, etc. sought by the person presenting the identifying credentials 122, and the method 500 ends. The denial 514 of access may be denial of entry to a location, may be denial 514 of a transaction, may be denial 514 of opening of a lock, etc. In one embodiment, the denial module 304 denies 514 the person access.

Figure 6:
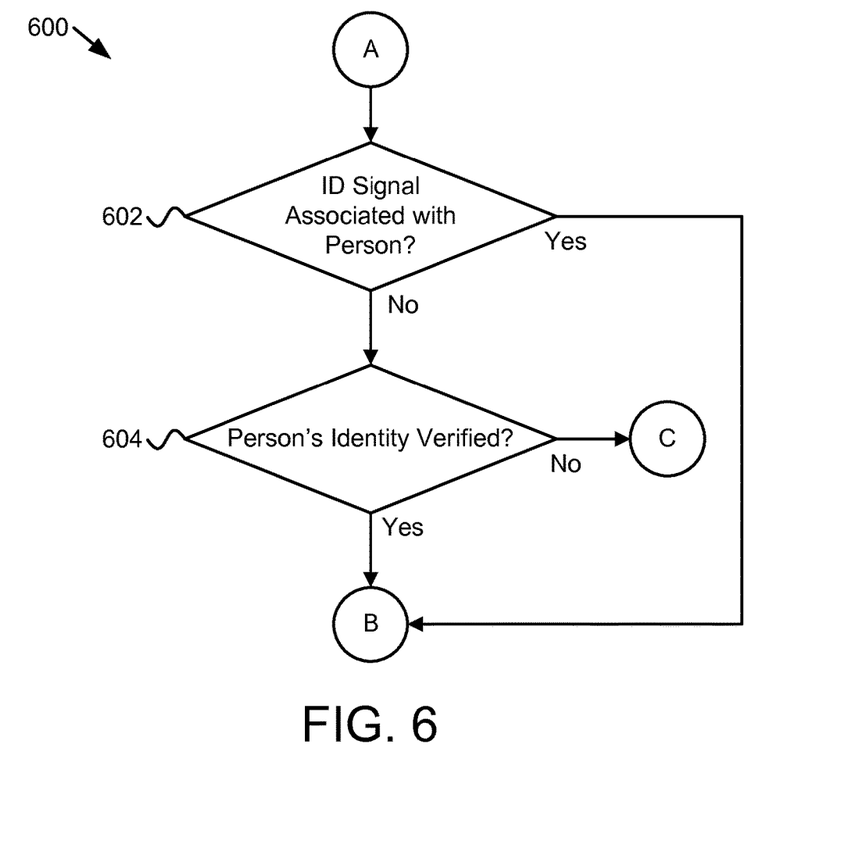
FIG. 6 is a schematic flow chart diagram illustrating one embodiment of a portion of a method for associating an ID signal with a person.

FIG. 6 is a schematic flow chart diagram illustrating one embodiment of a portion of a method 600 for associating an ID signal 108 with a person. The method 600, in one embodiment, begins after the method 500 of FIG. 5 detects 504 one or more ID signals 108 and optionally determines 602 if an ID signal 108 is associated with a person (follow "A" on FIG. 5 to "A" on FIG. 6). If the method 600 determines 602 that the ID signal 108 does not match an ID signal 108 associated with the person, the method 600 optionally determines 604 if the person's identify is verified, such as using the identifying credentials 122 and/or other enhanced verification.

If the method 600 determines 604 that the person's identity is verified, the method 600 returns (follow "B" on FIG. 6 to "B" on FIG. 5) and associates 502 the detected ID signal 108 with the person. If the method 600 determines 604 that the person's identify has not been verified, such as through an enhanced verification procedure or when building a database of ID signals 108 and associations, the method 600 returns (follow "C" on FIG. 6 to "C" on FIG. 5) and determines 506 if the identifying credentials 122 are valid. Note that the method 600 of FIG. 6 is intended to be used under certain conditions as described above in relation to the apparatuses 200, 300 of FIGS. 2 and 3.

Figure 7:
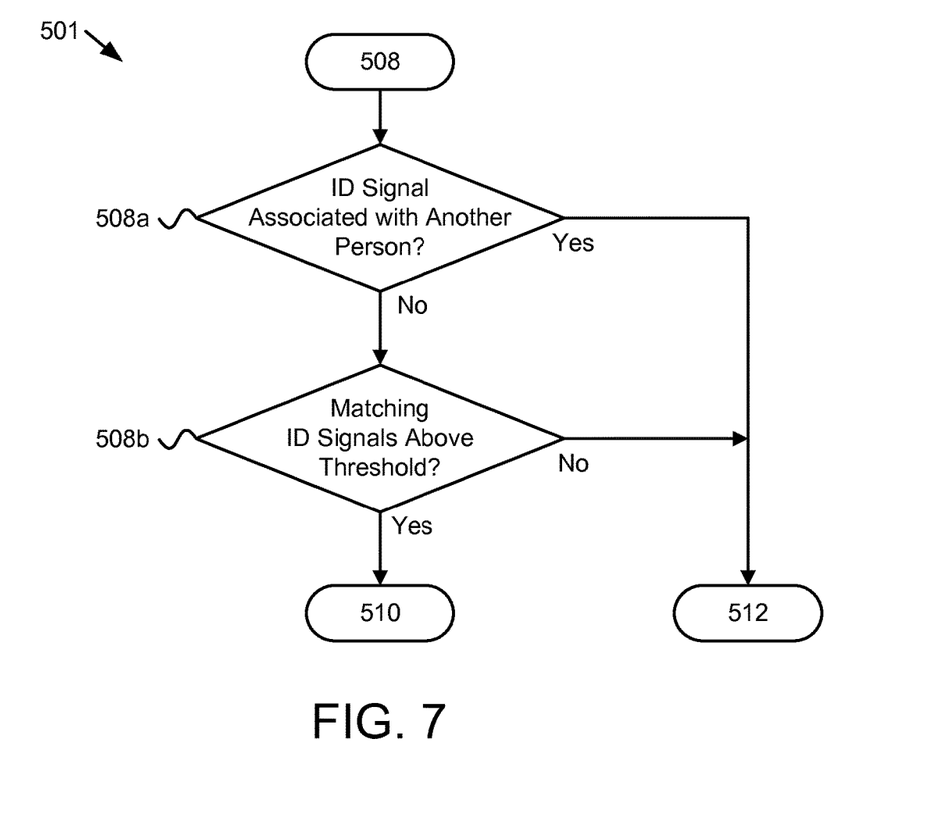
FIG. 7 is a schematic flow chart diagram illustrating one embodiment of additional steps of a method for verifying identity.

FIG. 7 is a schematic flow chart diagram illustrating one embodiment of additional steps of a method 501 for verifying identity. The method 501 is an enhancement of step 508 in FIG. 5, which is determining 508 if the detected ID signals 108 match ID signals 108 of a person. In one embodiment, the method 508 determines 508 if the ID signals 108 match ID signals 108 associated with a person by optionally determining 508a if a detected ID signal 108 is associated with another person. If the method 501 determines 508a that a detected ID signal 108 is associated with another person, the method 500 generates 512 an alert (as depicted in FIG. 5).

If the method 501 determines 508a that the detected ID signal 108 is not associated with another person, the method 501 optionally determines 508b if an amount or percentage of the detected ID signals 108 that match ID signals 108 associated with a person are above a match threshold. If the method 501 determines 508b that the amount or percentage of the detected ID signals 108 that match ID signals 108 associated with a person are above a match threshold, the method 500 confirms 510 identity of the person (as depicted in FIG. 5). If the method 501 determines 508b that the amount or percentage of the detected ID signals 108 that match ID signals 108 associated with a person are not above a match threshold, the method 500 generates 512 an alert (as depicted in FIG. 5).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    associating with a person, one or more identification ("ID") signals emitted by a personal device, each ID signal of the one or more ID signals comprising a wireless transmission with a unique identifier that differs from other identifiers transmitted wirelessly, wherein the ID signals are associated with a person in a database;
    detecting one or more ID signals from the personal device using one or more signal sensors;
    receiving identifying credentials from the person at a device that is independent from the personal device;
    confirming, at the device independent from the personal device, identity of the person in response to verifying identity of the person based upon the received identifying credentials from the person and verifying that one or more of the detected ID signals are associated with the person; and
    generating and sending an alert in response to one or more of the detected ID signals not matching the ID signals associated with the person, the alert generated in response to determining that a percentage of the detected ID signals matching ID signals associated with the person does not satisfy a match threshold, the match threshold determined as a function of the number of ID signals that are detected.

2. The method of claim 1, further comprising, in response to receiving the alert, one or more of:
    denying entry of the person when the identifying credentials comprise a request for entry;
    declining a financial transaction when the identifying credentials comprise a request to approve a financial transaction; and
    maintaining a lock in a locked state when the identifying credentials comprise a request to open the lock.

3. The method of claim 1, wherein the one or more detected ID signals comprise one or more of a radio frequency identification ("RFID") signal, an identification signal transmitted using a near field communication protocol, an identification signal transmitted using a short distance data exchange protocol, and an identifier transmitted over a Wi-Fi network.

4. The method of claim 1, wherein the one or more detected ID signals are transmitted from one or more of:
    an ID transmitter in a vehicle of the person;
    an ID transmitter in a key fob of the person;
    an ID transmitter in an electronic device attached to the person;
    an ID transmitter in an access card;
    an ID transmitter in a portable electronic device;
    an ID transmitter in a portable communication device of the person;
    an ID transmitter in a credit card;
    an ID transmitter in a debit card; and
    an ID transmitter in a card issued by a vendor.

5. The method of claim 1, wherein associating one or more ID signals with a person comprises storing the one or more ID signals in a database entry along with identifying credentials of the person.

6. The method of claim 1, wherein associating one or more ID signals with a person comprises an action by the person to register the ID signals.

7. The method of claim 1, wherein associating one or more ID signals with a person comprises an action by a party without an action by the person.

8. The method of claim 1, wherein associating one or more ID signals with a person further comprises:
    detecting one or more ID signals;
    determining that the one or more detected ID signals are not currently associated with the person; and
    associating the one or more detected ID signals with the person.

9. The method of claim 1, wherein the identifying credentials of the person comprise one of:
    an ID signal in addition to the one or more detected ID signals with the person;
    a wireless request;

a keypad entry;
a retina scan;
a scan from a fingerprint reader;
a scan from a magnetic stripe reader;
a body scan of the person;
an image of the person; and
insertion of a key in a lock.

10. An apparatus comprising:
an association module that associates, with a person one or more ID signals by a personal device, each ID signal of the one or more ID signals comprising a wireless transmission with a unique identifier that differs from other identifiers transmitted wirelessly, wherein the association module associates the ID signals with the person in a database;
an ID detection module that detects one or more ID signals from the personal device using one or more signal sensors;
a confirmation module that:
receives identifying credentials from the person at a device that is independent from the personal device; and
confirms, at the device independent from the personal device, identity of the person in response to verifying identity of the person based upon the received identifying credentials from the person and the ID detection module verifying that one or more of the detected ID signals are associated with the person; and
an alert module that generates and sends an alert in response to one or more of the detected ID signals not matching the ID signals associated with the person, the alert generated in response to determining that a percentage of the detected ID signals matching ID signals associated with the person does not satisfy a match threshold, the match threshold determined as a function of the number of ID signals that are detected,
wherein said modules comprise one or more of hardware circuits, a programmable hardware device and a processor executing code.

11. The apparatus of claim 10, further comprising a denial module that, in response to receiving the alert, one or more of:
denies entry of the person when the identifying credentials of the person comprise a request for entry;
declines a financial transaction when the identifying credentials of the person comprise a request to approve a financial transaction; and
maintains a lock in a locked state when the identifying credentials of the person comprise a request to open the lock.

12. The apparatus of claim 10, wherein the association module associating one or more ID signals with a person further comprises:
the ID detection module detecting one or more ID signals by a personal device and determining that the one or more detected ID signals are not currently associated with the person; and
the association module associating the one or more detected ID signals with the person.

13. The apparatus of claim 10, wherein the confirmation module confirms identity by verifying identity of the person based upon identifying credentials further comprises:
verifying that an ID signal in addition to the one or more detected ID signals is associated with the person;
processing a wireless request and verifying that an identification signal in the wireless request corresponds to the person;
verifying that a keypad entry matches a stored code;
verifying that a retina scan matches a retina scan of the person;
verifying that a scan from a fingerprint reader matches a fingerprint of the person;
verifying that a scan from a magnetic stripe reader is valid;
verifying that a body scan of the person includes elements that match identifying characteristics of the person;
verifying that an image of the person matches a stored image of the person; and
allowing tumblers in a lock to unlock a lock in response to insertion of a key in a lock and turning the key in the lock.

14. A system comprising:
one or more signal sensors;
an ID receiver;
an association module that associates, with a person one or more ID signals by a personal device, each ID signal of the one or more ID signals comprising a wireless transmission with a unique identifier that differs from other identifiers transmitted wirelessly, wherein the association module associates the ID signals with the person in a database;
an ID detection module that detects, using the one or more signal sensors, one or more ID signals from the personal device using one or more signal sensors;
a confirmation module that:
receives identifying credentials from the person at a device that is independent from the personal device; and
confirms, at the device independent from the personal device, identity of the person in response to verifying identity of the person based upon the received identifying credentials from the person and the ID detection module verifying that one or more of the detected ID signals are associated with the person; and
an alert module that generates and sends an alert in response to one or more of the detected ID signals not matching the ID signals associated with the person, the alert generated in response to determining that a percentage of the detected ID signals matching ID signals associated with the person does not satisfy a match threshold, the match threshold determined as a function of the number of ID signals that are detected,
wherein said modules comprise one or more of hardware circuits, a programmable hardware device and a processor executing code.

15. The system of claim 14, further comprising:
a hardware processor; and
one or more computer readable storage media in communication with the hardware processor, wherein said modules are stored on the one or more computer readable storage media and execute on the hardware processor,
wherein the database comprises identification information for each person and ID signals associated with each person.

* * * * *